US006957192B1

(12) United States Patent
Peth

(10) Patent No.: US 6,957,192 B1
(45) Date of Patent: Oct. 18, 2005

(54) SYSTEM AND METHOD FOR AUTOMATED CREDIT MATCHING

(75) Inventor: Steven H. Peth, Concord, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 721 days.

(21) Appl. No.: 09/645,108

(22) Filed: Aug. 23, 2000

(51) Int. Cl.[7] ............................................ G06F 17/60
(52) U.S. Cl. ......................... 705/38; 705/39; 703/35; 703/38; 703/39
(58) Field of Search ........................... 705/35, 38, 40, 705/39

(56) References Cited

U.S. PATENT DOCUMENTS

| | | | |
|---|---|---|---|
| 5,732,400 A * | 3/1998 | Mandler et al. | 705/26 |
| 5,949,876 A | 9/1999 | Ginter et al. | 380/4 |
| 5,960,408 A | 9/1999 | Martin et al. | 705/11 |
| 5,960,411 A | 9/1999 | Hartman et al. | 705/26 |
| 6,014,647 A | 1/2000 | Nizzari et al. | 705/39 |
| 6,029,142 A | 2/2000 | Hill | 705/27 |
| 6,032,184 A | 2/2000 | Cogger et al. | 709/223 |
| 6,038,597 A | 3/2000 | Van Wyngarden | 709/219 |
| 6,324,525 B1 * | 11/2001 | Kramer et al. | 705/40 |
| 6,385,594 B1 * | 5/2002 | Lebda et al. | 705/38 |
| 6,473,740 B2 * | 10/2002 | Cockrill et al. | 705/27 |
| 6,611,818 B1 * | 8/2003 | Mersky et al. | 705/40 |

FOREIGN PATENT DOCUMENTS

JP          09237305 A  *  9/1997  ........... G06F 19/00

OTHER PUBLICATIONS

Giving Credit where credit is due-Hilbert, Pia-Business Mexico, v4n7, p.: 23-25, Jul. 1994.*

"Big Buyers jump on the Internet", Mar. 23, 2000, Purchasing, (http://www.manufacturing.net/magazine/purchasin . . . /032isupp.ht, (Aug. 30, 2000).

J. Kelleher, "e-procurement Unleasing Corporate Purchasing Power", Fortune, (http://www.fortune.com/fortune/sections/e . . . /eprocurement2000.ht) (Aug. 30, 2000).

"Commerce One Delivers BuySite 6.0", Commerce One, Jan. 24, 2000, (http://www.commerceone.com/news/us/buysite6_launch.htm) (Aug. 20, 2000).

"e-commerce for Chemicals Newsletter", eye for chem, Jan. 28, 2000, (http://www.ecchemicals.com/ecchemicals/news012800.shtml) (Aug. 30, 2000).

"Frontstep's Commerce One-powered E-procurement Site "Opens for Business" with Customer Transactions", Frontstep, Jan. 27, 2000, (http://www.frontstep.com/press/ESPprocure.html) (Aug. 30, 2000).

(Continued)

*Primary Examiner*—James P. Trammell
*Assistant Examiner*—Daniel L. Greene
(74) *Attorney, Agent, or Firm*—Timothy J. Hadlock

(57) ABSTRACT

The invention includes a method of financing eCommerce purchases including: receiving over the Internet buyer registration information. Then evaluating a credit rating for the buyer and passing over the Internet the credit rating to a seller, and then receiving over the Internet from the seller seller's credit options for the buyer. The next steps are determining other credit provider's credit options for the buyer, creating a database of the credit options for the buyer. After receiving over the Internet an order for the buyer, then querying the database with query criteria specific to the order, thereby resulting in a report of credit options for the buyer for the order. Passing over the Internet the report to the buyer; receiving over the Internet the buyer's selection of a credit option; passing over the Internet a payment schedule for the buyer to an intermediary; and receiving payment remitted from the buyer.

11 Claims, 9 Drawing Sheets

OTHER PUBLICATIONS

B2B Worth reading (96 links), B2B worth reacing-eCommerce Info Center, 2000, (http://www.ecominfocenter.com/b2b/b2bworthreading.html) (Aug. 30, 2000).

"IT/IS Outsourcing Option: For Improvement in cost control & benchmarking service", PetropagesNet—Petroleum News, Jun. 2000, (http://www.petropagesnet.com/News/0700/Other.htm) (Aug. 30, 2000).

Diane Volek, "Electronic procureent, the internet and you", Knowledge Dynamics Library, (http://www.kd.co.za/library/articles/e_procurement.htm) (Aug. 30, 2000).

"boost your b2b knowledge", NMM Weekly Market News, (http://www.netmarketmakers.com/archives/we.../031300nmmw.as) (Aug. 30, 2000).

* cited by examiner

```
SELECT *
FROM SELLER1, SELLER2, SELLER_N
WHERE (SELLER_N.Attribute 1
OR
SELLER_N.ATTRIBUTE 2
OR
SELLER_N.ATTRIBUTE_N = '_____ Insert Buyers Credit Preferences_____'
AND SELLER_N.ATTRIBUTE_N = BUYER.Attribute_N;
```

Fig. 6A

```
SELECT *
FROM CREDIT_TERMS
WHERE (CREDIT_TERMS.Attribute 1
OR
CREDIT_TERMS.ATTRIBUTE 2
OR
CREDIT_TERMS.ATTRIBUTE_N)=_____ Insert Buyers Credit Preferences_____
AND CREDIT_TERMS.ATTRIBUTE_N = BUYER.Attribute_N;
```

Fig. 6B

SYSTEM AND METHOD FOR AUTOMATED CREDIT MATCHING

I. COPYRIGHT NOTICE AND AUTHORIZATION

This patent document contains material which is subject to copyright protection.

(C) Copyright 1999–2000 Chevron U.S.A. Inc. All rights reserved.

With respect to this material which is subject to copyright protection. The owner, Chevron Products Company, a division of Chevron U.S.A. Inc., has no objection to the facsimile reproduction by any one of the patent disclosure, as it appears in the Patent and Trademark Office patent files or records of any country, but otherwise reserves all rights whatsoever.

II. FIELD OF THE INVENTION

This invention relates to system and method for credit matching, especially in facilitating eCommerce transactions.

III. BACKGROUND OF THE INVENTION

Electronic commerce ("eCommerce") has proliferated over the Internet recently. One difficulty in eCommerce is handling payment processes. Presently, in Business-to-Consumer ("B2C") eCommerce, credit card payment and debit settlement are common methods of payment where the price of goods or services are relatively low. Business-to-Business ("B2B") eCommerce and some high dollar transactions in the B2C eCommerce, e.g., cars or furniture, however, can involve significantly higher dollar transactions than in the lower dollar B2C eCommerce. Thus, in those cases credit card payments and debit settlements are often inappropriate or unavailable. To date, the payment and credit mechanisms utilized in B2B eCommerce transactions have followed the same model as with non-eCommerce transactions. That is, to extend credit the seller evaluates the buyers credit rating and offers from zero or several credit offerings.

The buyer either then selects one credit offering from the seller or obtains a loan from a third-party lender. Traditionally, large sellers only sell to large buyers in bulk with no little or no credit extension. Thus, small buyers' offers to buy small quantities from large sellers are typically rejected by the large seller. This is often because the small buyer requires credit and the large seller does not wish to extend credit since it would result in carrying accounts receivable for numerous small buyers. All of this credit offering determination and selection is manpower and time intensive, thus greatly slowing the speed of the transaction. Also, if the buyer is not satisfied with the credit offerings of the seller, the buyer has little or no choice to easily, quickly, and conveniently secure other credit options.

Accordingly, there is a need for an automated credit evaluation, automated credit terms matching, and automated buyer selection and offering acceptance process which better matches the Internet's faster transaction capabilities and otherwise overcomes the above-described deficiencies. The method and system of the invention described herein provides such a solution.

IV. SUMMARY OF THE INVENTION

The invention includes a method of financing eCommerce purchases including: receiving over the Internet buyer registration information. Then evaluating a credit rating for the buyer and passing over the Internet the credit rating to a seller, and then receiving over the Internet from the seller seller's credit options for the buyer. The next steps are determining other credit provider's credit options for the buyer, creating a database of the credit options for the buyer. After receiving over the Internet an order for the buyer, then querying the database with query criteria specific to the order, thereby resulting in a report of credit options for the buyer for the order. Passing over the Internet the report to the buyer; receiving over the Internet the buyer's selection of a credit option; passing over the Internet a payment schedule for the buyer to an intermediary; and receiving payment remitted from the buyer.

In another embodiment, the invention includes a method of financing eCommerce purchases including: evaluating a credit rating for the buyer, passing the credit rating to a seller, receiving from the seller seller's credit options for the buyer, determining other credit provider's credit options for the buyer, creating a database combining all of the credit options for the buyer, retrieving from the database a report of credit options for the buyer, passing the report to the buyer, entering a credit agreement with the buyer for at least one of the credit options, passing funds borrowed pursuant to the credit agreement to the buyer or the buyer's designated recipient; and receiving funds from the buyer in repayment of the borrowed funds pursuant to the credit agreement.

In another embodiment, the invention includes a memory for storing data for access by an application program being executed on a data processing system, including a buyer relation; a seller relation; an order relation; a credit provider relation; a credit terms relation; and a products relation; and wherein the attributes of said relations are selected such that such relations form a relational database.

In other embodiments the invention includes systems configured and adapted to perform the steps listed in the above-described methods, and computer readable media containing computer readable instructions configured and adapted to perform the steps listed in the above-described methods.

These and other features and advantages of the present invention will be made more apparent through a consideration of the following detailed description of a preferred embodiment of the invention. In the course of this description, frequent reference will be made to the attached drawings.

V. BRIEF DESCRIPTION OF THE DRAWINGS

Figure 5:
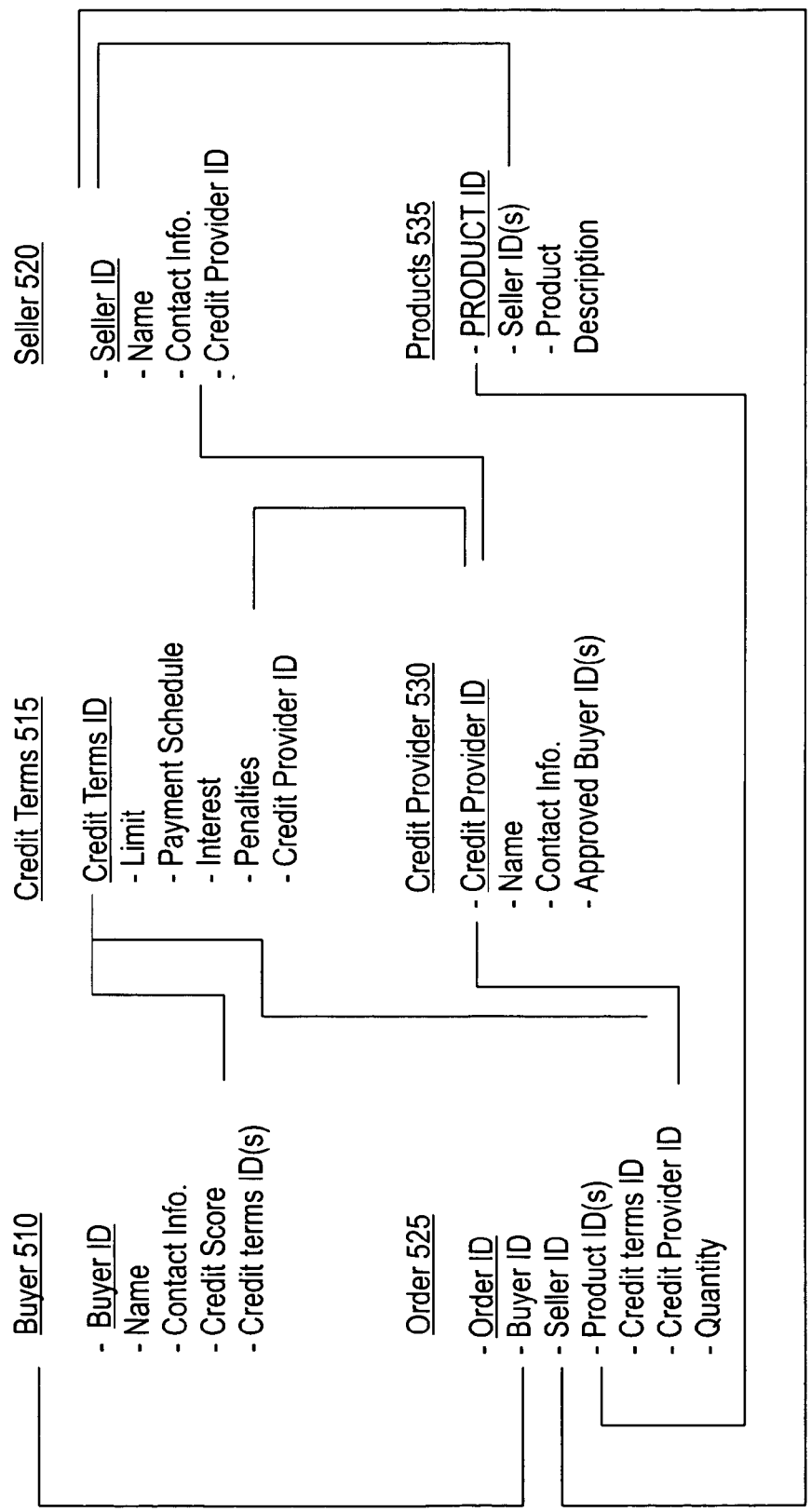

FIG. 5 is an example in one embodiment of relations for use in a credit option database. By way of background, databases require a consistent structure, termed a schema, to organize and manage the information. In a relational database, the schema is a collection of tables. For each table, there is generally one schema to which it belongs. In an implementation of a relational database, a relation corresponds to a table having rows, where each row corresponds to a record (or tuple), and columns, where each column corresponds to a field (or attribute). From a practical standpoint, rows represent records of related data and columns identify individual data elements.

FIGS. 6A–6B illustrate in one embodiment sample SQL-type database queries for matching credit options for a buyer.

Figure 7:
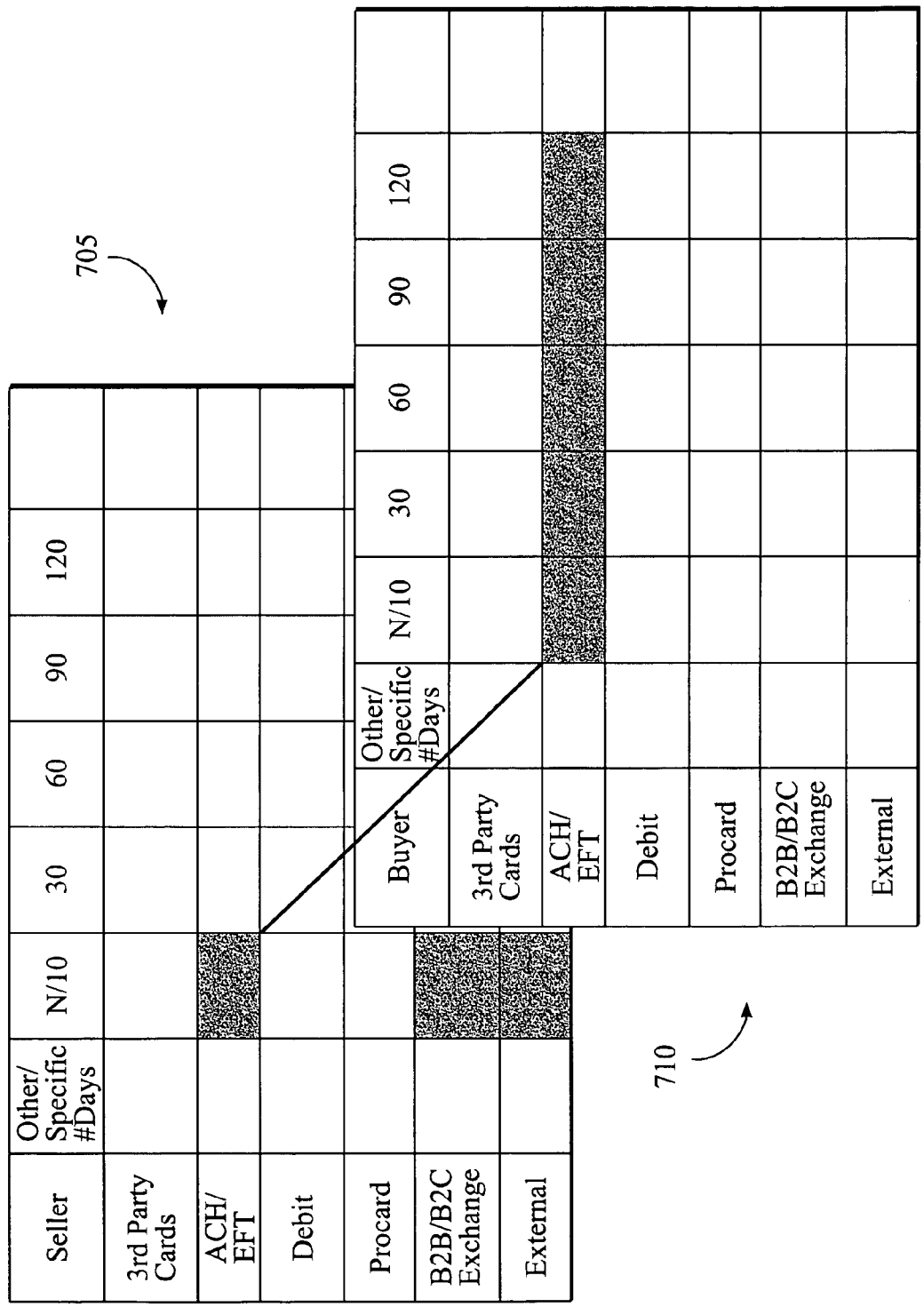
Figure 8:
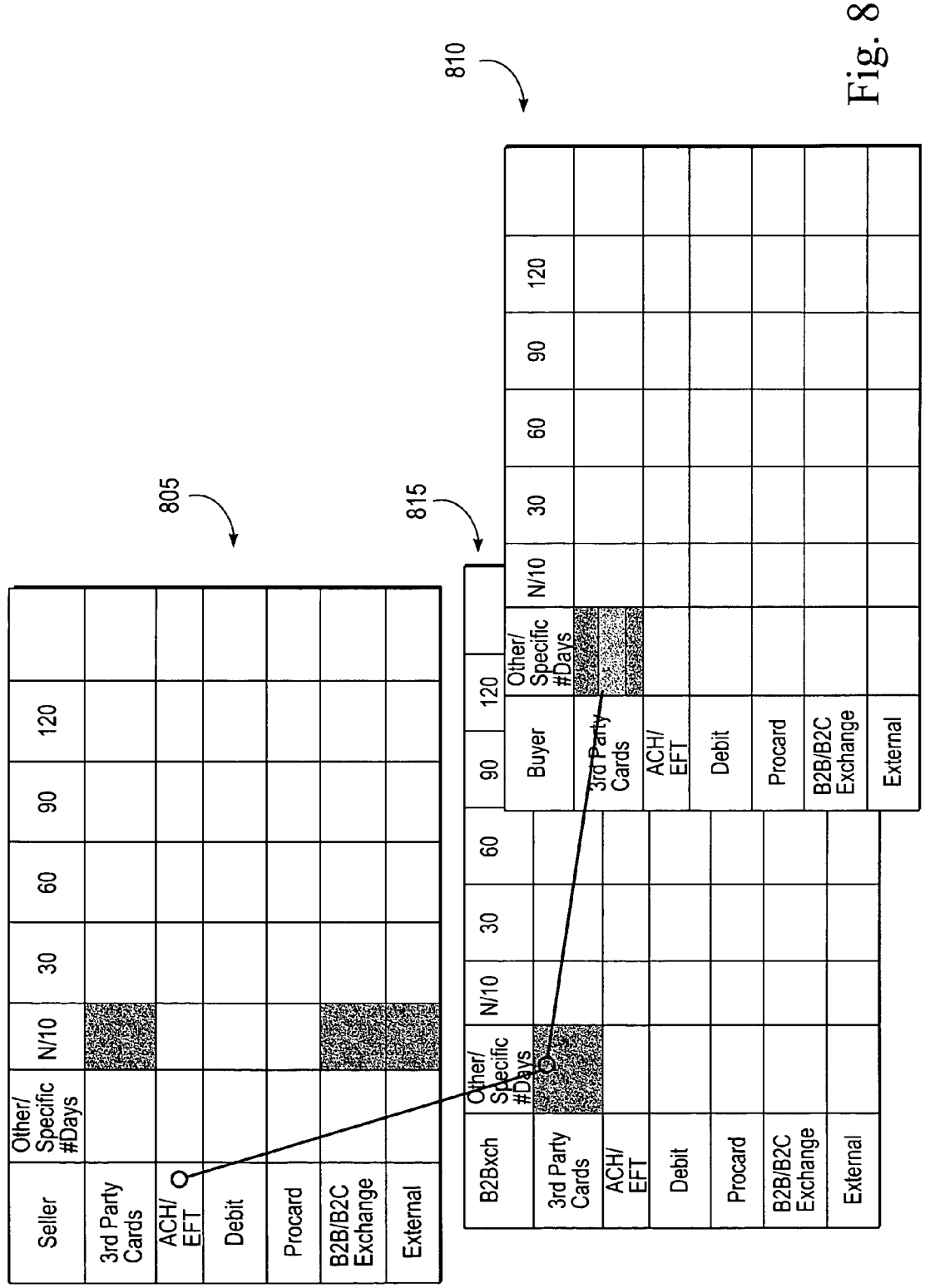
Figure 9:
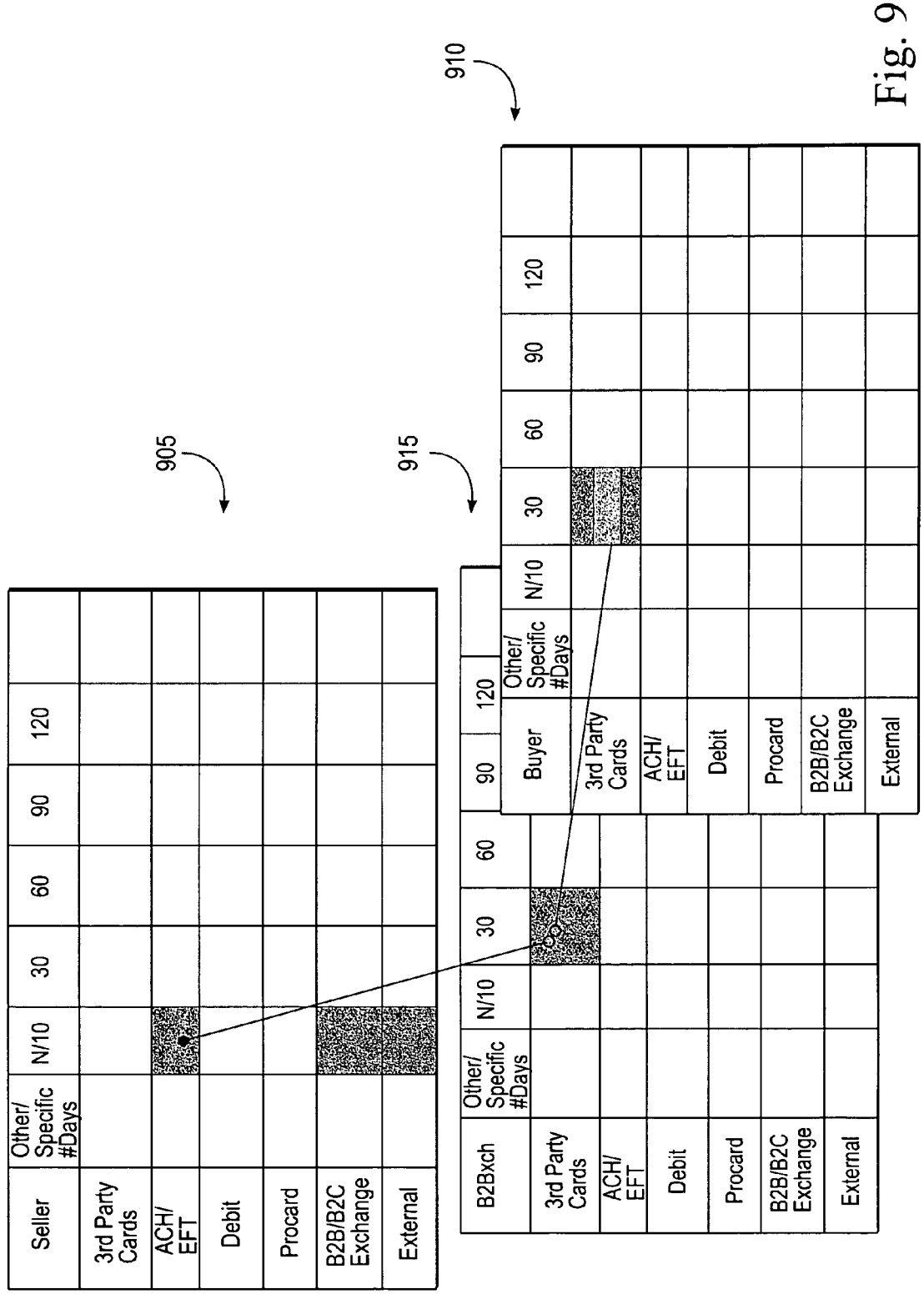

FIGS. 7–9 depicts in one embodiment various schematic diagrams of the exemplary logical process involved in credit matching for various scenarios.

VI. DETAILED DESCRIPTION OF PREFERRED EMBODIMENTS

The major components (also interchangeably called aspects, subsystems, modules, functions, services) of the system and method of the invention, and examples of advantages they provide, are described below with reference to the figures. For figures including process/means blocks, each block, separately or in combination, is alternatively computer implemented, computer assisted, and/or human implemented. Computer implementation optionally includes one or more conventional general purpose computers having a processor, memory, storage, input devices, output devices and/or conventional networking devices, protocols, and/or conventional client-server hardware and software. Where any block or combination of blocks is computer implemented, it is done optionally by conventional means, whereby one skilled in the art of computer implementation could utilize conventional algorithms, components, and devices to implement the requirements and design of the invention provided herein. However, the invention also includes any new, unconventional implementation means.

Figure 1:
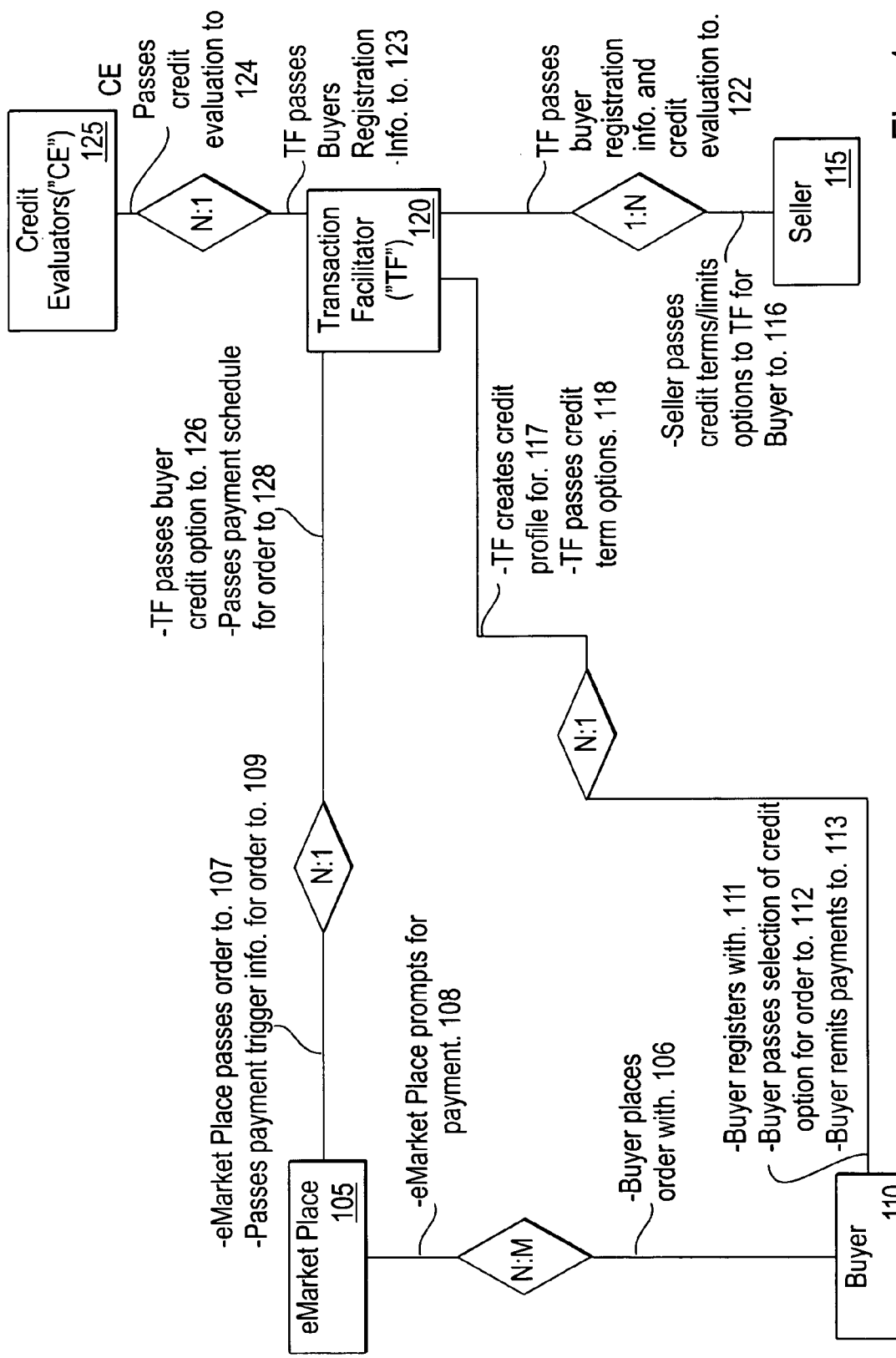
FIG. 1 is a schematic diagram combining aspects of a conceptual data model/entity-relationship diagram and data flow diagram showing the key components of one embodiment of the invention and their interrelationships.

FIG. 1 is a schematic diagram combining aspects of a conceptual data model/entity-relationship diagram and a data flow diagram. It shows the key entities of one embodiment of the invention and their interrelationships and key messages transferring between the entities in the practice of the process and system of the invention. Transaction Facilitator ("TF") 120 optionally provides financing services to multiple buyers 110, multiple sellers 115, multiple eMarket Places, and obtains services from multiple credit evaluators 125. Note that a party could play multiple rolls in the process at different times or at the same time. For example, a party could be both a buyer of goods and a seller of goods. Buyer 110 register with, passes credit option selections, and remits payments to TF 120. TF creates credit profile for, and passes credit options for a particular order to, buyer 110. Buyer then accepts a credit offering from TF. TF closes the financial order loop between buyer, seller, credit provider and TF. TF initiates financial transactions based on accepted credit terms.

One embodiment of a eCommerce financing method/process according to the invention with the entities shown in FIG. 1 is as follows. Buyer 110 registers with transaction facilitator 120. Registration includes: buyer's identification of sellers from which buyer contemplates doing business; general business and financial information needed to facilitate credit evaluation by TF (e.g., financial statements) or seller (including existing credit enhancements from external providers); and credit needs and preferences for those suppliers previously indicated.

Registration information of buyer 110 is processed through credit evaluator to produce proprietary credit profile. The credit profile is passed with registration information and/or proprietary credit profile to anticipated sellers 115 specified by buyer. Seller 115 registers approved credit limit and terms for each buyer and/or buyer profile with transaction facilitator.

Buyer 110 initiates purchase request with Market Place exchange 105. Market Place Exchange passes purchase request to transaction facilitator 120. Transaction facilitator 120 determines payment terms options based on approved credit limits and terms offered by sellers. Transaction facilitator 120 passes sellers' purchase approval and sellers' approved payment terms options, as well as TF and other $3^{rd}$ party credit extension, if any, to buyer.

Transaction facilitator 120 passes other credit offerings to buyer; these may include, e.g., additional capacity to buy, longer payment terms for revolving credit. Buyer 110 indicates acceptance or rejection of terms offered by the supplier or by the transaction facilitator. Transaction facilitator 120 notifies Market Exchange 105 of buyers 110 acceptance and selected payment method. Market Exchange 105 advises transaction facilitator as to when events occur that trigger dates required to schedule payment (e.g., ship date).

Transaction facilitator passes payment scheduling information to the Market Place Exchange. Transaction facilitator 120 advises Market Place Exchange when to prompt buyer for payment (full transaction information is optionally located in the Market Place Exchange). Buyer remits payment to transaction facilitator, or TF initiates EFT according to buyer-accepted payment schedule. Transaction facilitator aggregates payments from many buyers for each seller and remits funds to seller with accounts receivable information. Also, the functions of the TF could be combined with some or all of the roles of a Market Place Exchange, especially financial roles, or vice versa. TF may only be a service provider or optionally may also be a lender/credit provider.

Numerous variations on the above method will be understood by those skilled in the art and are within the scope of the invention. For example, payment remittance could pass from buyer 110 to Market Place Exchange 105 or other intermediary before passing to TF 120 or could pass directly to Seller 115 where Seller is the lender/credit provider.

Figure 2:
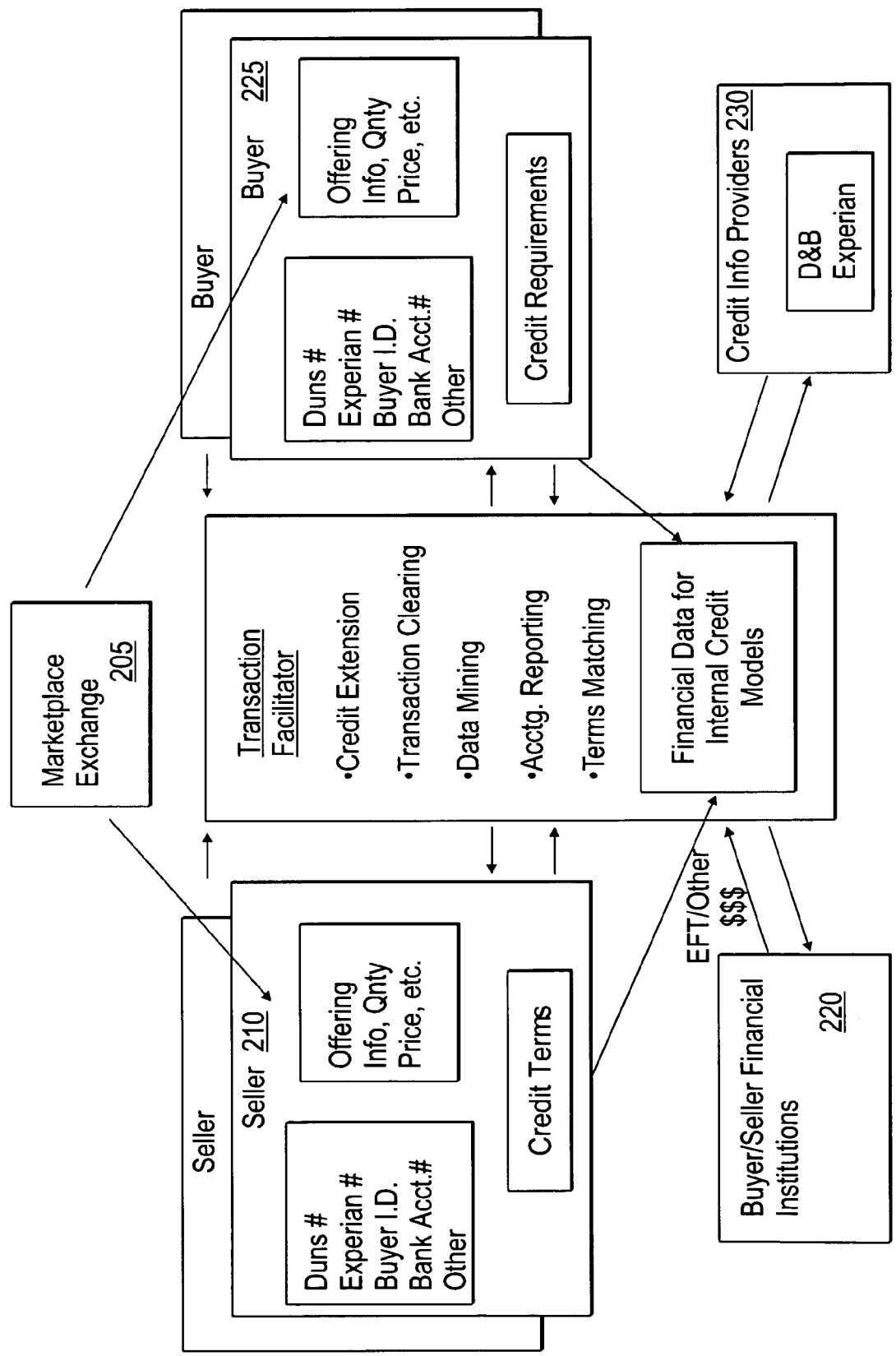
FIG. 2 is an alternate entity-relationship diagram showing the key components of one embodiment of the invention and their interrelationships.

FIG. 2 is an alternate entity-relationship diagram showing the key components of one embodiment of the invention and their interrelationships. FIG. 2 depicts substantially the same entities and relationships as in FIG. 1 except that a new entity is depicted, i.e., the buyers' and/or sellers' financial institution 220. Receipt of payment remittances from buyer is optionally directly from buyer's financial institution, e.g., by ACH or EFT. Transfer of funds from TF 215 to seller 210 is optionally made directly to seller's financial institution 220. In the TF entity 215, internal processes shown include credit extension, transaction clearing, data mining, accounting reporting, and terms matching. TF 215 optionally maintains its own data for determining a buyer's credit score and corresponding credit options to be extended to buyer 225.

TF 215 passes buyer registration information to seller 210 and seller passes available credit terms/limits for buyer to TF. TF passes buyer registration information to credit evaluator 230 (also referenced throughout as Credit Info. Provider) (e.g., Experian, Dunn & Bradstreet), and receives credit score and/or other financial information back from credit evaluator. An eMarket place 205 passes a buyer's order information, and payment triggering dates, to TF 215. TF passes buyer credit option selection and payment schedule to eMarket Place 205. There are several variations on the buyer registration step and credit evaluation step, e.g., automated registration via cookies or related technologies. Also, credit evaluation could involve accessing, separately or in combination, a plurality of commercial and proprietary databases for credit histories. That credit information may optionally be processed, separately or in combination, through a plurality of commercial and proprietary credit evaluation application programs to determine the risk of lending to a particular buyer.

Figure 3:
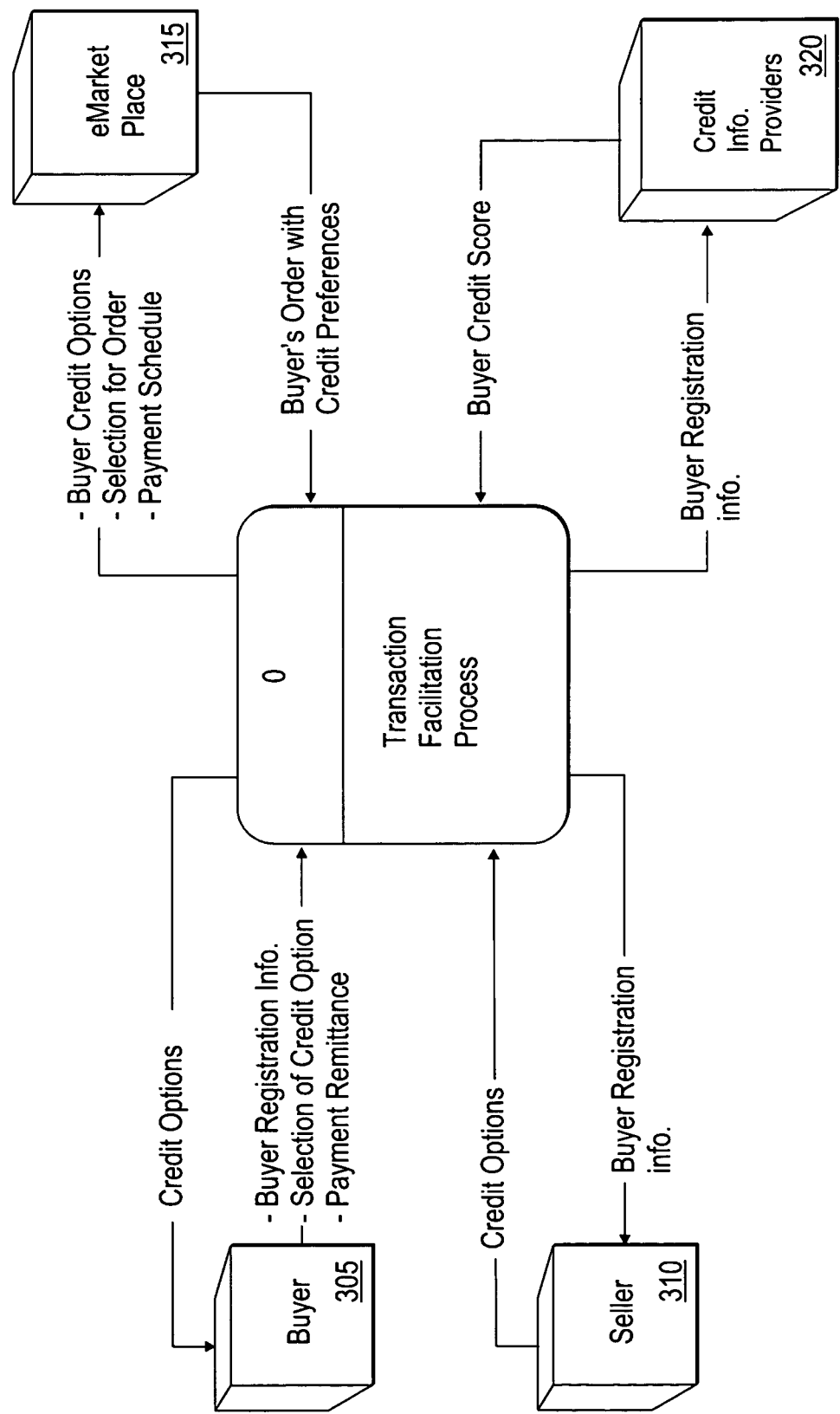
FIG. 3 is a schematic block system level 0 flow chart diagram of one embodiment of the invention.

FIG. 3 is a schematic block system level 0 flow chart diagram of one embodiment of the invention. Buyer 305 passes registration information to the Transaction Facilitation ("TF") Process 0. The TF process 0 passes this registration information to Credit Information Provider 320. The Credit Info. Provider performs a credit scoring process on the Registration Information together with any credit history information held by the Credit Info. Provider to develop a credit score, credit profile, and/or other product useful for a Credit Provider in assessing risk (individually or in any combination referred to as "credit score"). The Credit Info. Provider 320 passes the Buyer's credit score to the TF process 0. In the TF process, the credit score is passed to one or more sellers 310. The sellers use the credit score in a credit evaluation process to develop credit offerings for a buyer 305. The seller passes the credit offerings for a buyer to the TF process. In the TF process, a database (or look up table) is created containing all available credit offerings from all sellers designated in the buyer's registration and from any third-parties.

Upon receiving a product/service order from a buyer, an eMarketplace will pass the order with buyer's credit preferences for that order to the TF process. In the TF process, a matching process occurs whereby the buyer's credit preferences are compared to credit offerings available from the seller(s) and, if none or insufficient, credit offerings of third-parties and/or optionally the TF are checked. One or more credit offerings are then passed to the buyer 305 who selects one option and passes that decision to the TF process.

In the TF process, the buyer's credit selection together with a corresponding payment schedule is passed to the eMarketplace. The buyer remits payments or TF initiates EFT draft or other payment according to the payment schedule set during the ordering process. In the TF process the buyer's payment is transferred to the seller if the seller extended the credit less an transaction fee, if any. Where a third-party provides some or all of the credit, the TF process transfers payment to the seller upon shipment of products or other designated schedule. Alternatively, third-party funds are transferred to the buyer, who is the borrower, who then arranges payment with the seller.

Figure 4:
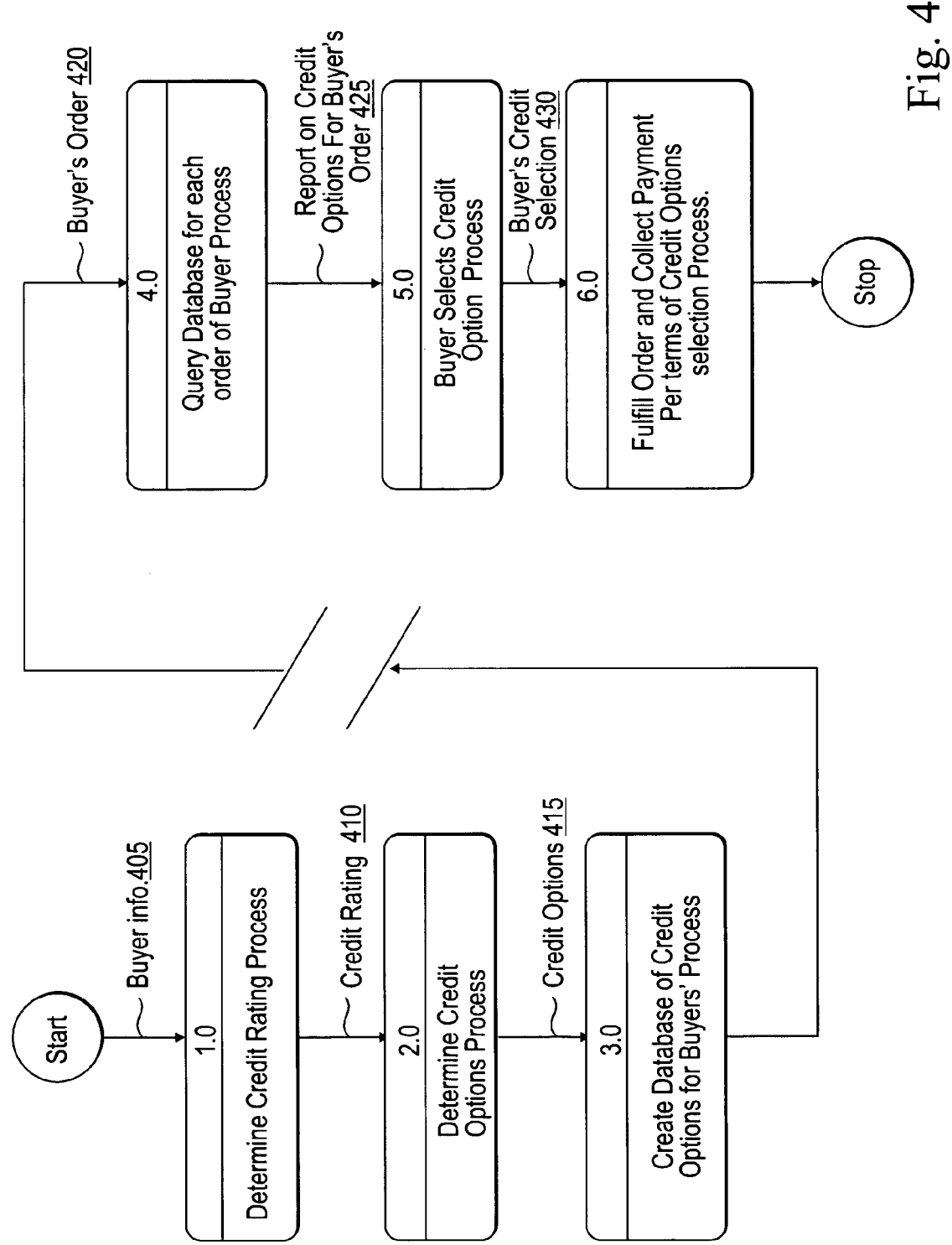
FIG. 4 is a schematic level 1 data flow diagram (a first decomposition of the system diagram in FIG. 3) and shows logical data flow between major processes of one embodiment of the invention.

FIG. 4 is a schematic level 1 data flow diagram (a first decomposition of the system diagram in FIG. 3) and shows logical data flow between major processes of one embodiment of the invention. Information about a Buyer, e.g., registration information and credit history 405, optionally from the buyer, credit agencies, and/or a plurality of other data sources passes to process 1.0, Determine Credit Rating Process. There a credit rating 410 (also referred to throughout as "credit score") is determined and passed to process 2.0, Determine Credit Options Process. That process determines credit options 415 for a buyer and passes information about those credit options 415 to process 3.0, Create database of Credit Options for Buyer Process.

The time elapsed between the buyer registration step and the completion of the creation of credit options database step is preferably minimal, e.g., less than 5, 3, 2, or 1 minute, or more preferably in real-time. In order for the data, e.g., buyer registration data, to be successfully passed between the processes, the data must be in a format acceptable to the receiving process. Preferably, to facilitate implementation among a large number of users, a standard format will be developed, such as is possible using Extensible Markup Language, the universal format for structured documents and data on the Web. Several industry-specific XML standard formats already exist.

In an optional step in the process the TF receives data from the buyer, seller, and/or eMarket Place regarding shortages, spoilages, breakages, or other problems with a received order. The TF processes this data in an order/invoice adjustment process to produce a revised order, payment terms statement to send the eMarket Place, buyer, and/or seller.

A structured database, typically using the relational model, is created using conventional tools, e.g., a relational database management system ("RDBMS"). A buyer's order 420 is based to process 4.0, Query Database for each Order of Buyer Process. Optionally, using conventional searching technology commonly provided with commercial RDBMS' or proprietary technology, the database is queried to determine available credit options for the buyer for the particular order. A report 425 is created of those options and passed to process 5.0, Buyer Selects Credit Option Process. The time elapsed between the order step and the completion of the credit options search step is preferably minimal, e.g., less than 5, 3, 2, or 1 minute, or more preferably in real-time. The buyer's selection 430 is passed to process 6.0, Fulfill Order and Collect Payment Per Terms of Credit Option Selection Process.

FIG. 5 is an example in one embodiment of relations for use in a credit option database. The Buyer relation 510 in one embodiment contains the following attributes: Buyer ID, Name, Contact Info., Credit Score, and Credit terms ID(s). The Seller relation 520 in one embodiment contains the following attributes: Seller ID, Name, Contact Info., and Credit Provider ID. The Credit Provider relation 530 in one embodiment contains the following attributes: Credit Provider ID, Name, Contact Info., and Approved Buyer ID(s). The Credit Terms relation 515 in one embodiment contains the following attributes: Credit Terms ID, Limit, Payment Schedule, Interest, Penalties, and Credit Provider ID. The Order relation 525 contains the following attributes: Order ID, Buyer ID, Seller ID, Product ID(s), Credit terms ID, Credit Provider ID, and Quantity. The Products relation 535 in one embodiment contains the following attributes: Product ID, Seller ID(s) and Product Description. Selection of attributes, attribute domains, keys and foreign keys, and normalization of relations sufficient to enable a database for determining available credit options for a particular buyer, having particular credit preferences, in a particular order, and from particular sellers is within the normal skill of one schooled in the database arts.

A seller's or other credit provider's credit offerings may vary depending on many factors, e.g., financial condition, economy, inventory, accounts receivables, buyer's status or order details, or other factors. Thus, in one embodiment of the invention the database is updated at regular intervals or upon some triggering event, e.g., based on size of an order, lapsed time from most recent order, or upon seller's request. As a result the credit score or evaluation of a buyer, the credit offerings of a seller or credit provider, and the credit offerings for a given order will be updated continually or on a flexible schedule as needed.

FIGS. 6A,B illustrates in one embodiment sample SQL-type database queries for matching credit options for a buyer. FIG. 6A depicts an exemplary SQL-type query where each seller's credit options for a buyer are stored in separate Seller relations. FIG. 6B depicts an exemplary SQL-type query where all credit options from all sellers and third-parties for all buyers are stored in separate Credit Terms relations. Persons skilled in the database arts know various alternative queries appropriate for a variety of database structures sufficient to return all credit options for a particular buyer.

FIGS. 7–9 depicts in one embodiment various schematic diagrams of the exemplary logical process involved in credit matching for various scenarios. With reference to FIG. 7, in this example, seller requirements 705 for cash settlement are transferred to TF and matched against credit requirements 710 as outlined by the buyer. In this case, a match is made for "EFT" settlement at 10 days following delivery. Dates of delivery and receipt are fed from the market exchange and TF executes the transaction on the appropriate date.

With reference to FIG. 8, in this example, seller requirements 805 for cash settlement are transferred to TF and matched against credit requirements 810 as outlined by the buyer. In this case, there is no match between buyer and seller. The exchange steps in with its credit offerings 815 to facilitate the transaction accepting the buyers desired used of a 3rd party bankcard on behalf of the seller. Cost of the interchange fee can be passed (or not passed) on from the seller to the buyer in the form of a handling or other transaction fees. Dates of delivery and receipt are fed from the market exchange and Riverpool executes the transaction on the appropriate date.

With reference to FIG. 9, in this example, seller requirements 905 for cash settlement are transferred to TF and matched against credit requirements 910 as outlined by the buyer. In this case, Seller wants good funds 10 days after delivery and buyer wants credit for 30 days. The eMarket Exchange (also referenced throughout as eMarket Place) or TF steps in with it credit offerings 915 to provide credit for 20 days to buyer at appropriate "pricing" based on risk assessment. Dates of delivery and receipt are fed from the eMarket exchange and TF executes the transaction on the appropriate dates.

The web site for the system includes conventional web site development considerations known to experienced web site developers. Such considerations include content, content clearing, presentation of content, architecture, database linking, external web site linking, number of pages, overall size and storage requirements, maintainability, access speed, use of graphics, choice of metatags to facilitate hits, privacy considerations, and disclaimers.

Optionally, a test environment is used prior to deployment of the production system. In the test environment, the web site is loaded into an isolated test environment for debugging and for other test purposes. A piloting step is also optionally utilized (it may also be called an alpha and/or beta testing step/means. In the pilot step, the system is internally test marketed. The piloting step/means optionally includes formally or informally gathering feedback from the internal users of the web site for use in improving and debugging the site and for use in planning the marketing step.

What is claimed is:

1. A method of financing eCommerce purchases comprising:
   (a) Receiving over the Internet buyer registration information;
   (b) Evaluating a credit rating for said buyer;
   (c) Passing over the Internet said credit rating to a seller;
   (d) Receiving over the Internet from said seller seller's credit options for said buyer;
   (e) Determining other credit provider's credit options for said buyer;
   (f) Creating a database of said credit options for said buyer, wherein said creating step occurs on a pre-determined schedule, in response to pre-determined triggering events, upon a seller's or credit provider's request;
   (g) Receiving over the Internet an order for said buyer;
   (h) Querying said database with query criteria specific to said order, thereby resulting in a report of credit options for said buyer for said order;
   (i) Passing over the Internet said report to said buyer;
   (j) Receiving over the Internet said buyer's selection of a credit option;
   (k) Passing over the Internet a payment schedule for said buyer; and
   (l) Receiving payment remitted from said buyer.

2. The method of claim 1, wherein the time elapsed between said receiving step (g) and said passing step (i) occurs in real-time.

3. A method of financing eCommerce purchases comprising:
   (a) Receiving over the Internet buyer registration information;
   (b) Evaluating a credit rating for said buyer;
   (c) Passing over the Internet said credit rating to a seller;
   (d) Receiving over the Internet from said seller seller's credit options for said buyer;
   (e) Determining other credit provider's credit options for said buyer;
   (f) Creating a database of said credit options for said buyer, wherein said creating step occurs on a pre-determined schedule, in response to pre-determined triggering events, upon a seller's or credit provider's request;
   (g) Receiving over the Internet an order for said buyer;
   (h) Querying said database with query criteria specific to said order, thereby resulting in a report of credit options for said buyer for said order;
   (i) Passing over the Internet said report to said buyer;
   (j) Receiving over the Internet said buyer's selection of a credit option;
   (k) Passing over the Internet a payment schedule for said buyer; and
   (l) Receiving payment remitted from said buyer;
   (m) wherein the time elapsed between said receiving step (g) and said passing step (i) is less than five minutes.

4. A method of financing eCommerce purchases comprising:
   (a) Evaluating a credit rating for said buyer;
   (b) Passing said credit rating to a seller;
   (c) Receiving from said seller seller's credit options for said buyer;
   (d) Determining other credit provider's credit options for said buyer;
   (e) Creating a database in a computer combining all of said credit options for said buyer;
   (f) Retrieving from said database a report of credit options for said buyer;
   (g) Passing said report to said buyer;
   (h) Entering a credit agreement with said buyer for at least one of said credit options;
   (i) Passing funds borrowed pursuant to said credit agreement to said buyer or the buyer's designated recipient;

(j) Receiving funds from said buyer in repayment of said borrowed funds pursuant to said credit agreement;

(k) wherein said creating step (e) occurs on a pre-determined schedule, in response to pre-determined triggering events, upon a seller's or credit provider's request; and (l) wherein said passing, retrieving, and receiving steps occur over a network comprising an Internet system.

5. A method of financing eCommerce purchases comprising:

(a) Evaluating a credit rating for said buyer;

(b) Passing said credit rating to a seller;

(c) Receiving from said seller seller's credit options for said buyer;

(d) Determining other credit provider's credit options for said buyer;

(e) Creating a database combining all of said credit options for said buyer;

(f) Retrieving from said database a report of credit options for said buyer;

(g) Passing said report to said buyer;

(h) Entering a credit agreement with said buyer for at least one of said credit options;

(i) Passing funds borrowed pursuant to said credit agreement to said buyer or the buyer's designated recipient; and (j) Receiving funds from said buyer in repayment of said borrowed funds pursuant to said credit agreement;

(k) wherein the time elapsed between said retrieving steps (f) and said passing step (i) is less than three minutes;

(l) wherein said passing, retrieving, and receiving steps occur over a network comprising an Internet system;

(m) wherein said creating step (e) occurs on a pre-determined schedule, in response to pre-determined triggering events, upon a seller's or credit provider's request.

6. A method of facilitating commercial transactions over a network, said method comprising:

(a) Creating a database of credit options for a buyer;

(b) Receiving over a network an order for said buyer;

(c) Querying said database with query criteria specific to said buyer and to said order, thereby resulting in a report of credit options for said buyer for said order;

(d) Passing said report over said network to said buyer;

(e) Receiving over said network said buyer's selection of a credit option; and (f) wherein said creating step (a) occurs on a pre-determined schedule, in response to pre-determined triggering events, upon a seller's or credit Provider's request.

7. The method of claim 6, wherein said network comprises the Internet.

8. A method of facilitating commercial transactions over a network, said method comprising:

(a) Creating a database of credit options for a buyer;

(b) Receiving over a network an order for said buyer;

(c) Querying said database with query criteria specific to said buyer and to said order, thereby resulting in a report of credit options for said buyer for said order;

(d) Passing said report over said network to said buyer, wherein the time elapsed between said receiving step (b) and said passing step (d) is less than two minutes;

(e) Receiving over said network said buyer's selection of a credit option; and (f) wherein said creating step (a) occurs on a pre-determined schedule, in response to pre-determined triggering events, upon a seller's or credit provider's request.

9. The method of claim 8, wherein said network comprises the Internet.

10. In an eCommerce vertical marketplace, a method of operating a database management system for facilitating extension of credit, said method comprising:

(a) Receiving information about a buyer sufficient to evaluate the relative risk of extending credit to said buyer;

(b) Determining said relative risk;

(c) Determining a plurality of credit options for said buyer from a plurality of credit providers based on said relative risk determined in step (b);

(d) Creating a database of said credit options for said buyer;

(e) wherein said database is constructed and adapted for querying, thereby resulting in a report of credit options for said buyer;

(f) wherein said database is in communication with a network constructed and adapted for passing said report to said buyer or to an intermediary for passing to said buyer;

(g) wherein said network comprises the Internet; and (h) wherein said creating step (d) occurs on a pre-determined schedule, in response to pre-determined triggering events, upon a seller's or credit provider's request.

11. The method of claim 10, wherein the time elapsed between said receiving step (b) and said creating step (d) is less than one minute.

* * * * *